Sept. 30, 1947.  J. A. HEIDBRINK  2,428,277
HUMIDIFIER FOR OXYGEN GAS
Filed Aug. 25, 1944  2 Sheets—Sheet 2
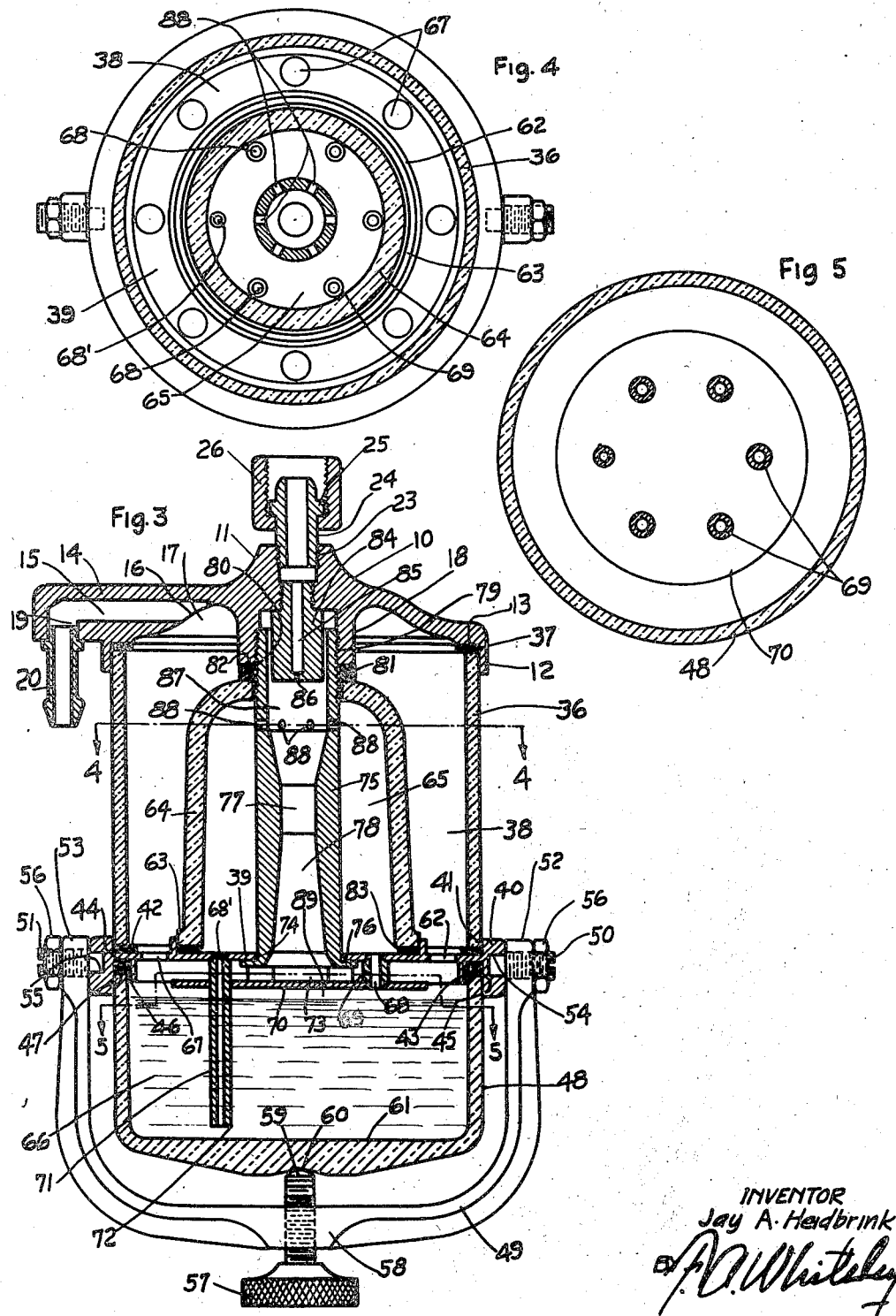
INVENTOR
Jay A. Heidbrink
Attorney Patented Sept. 30, 1947

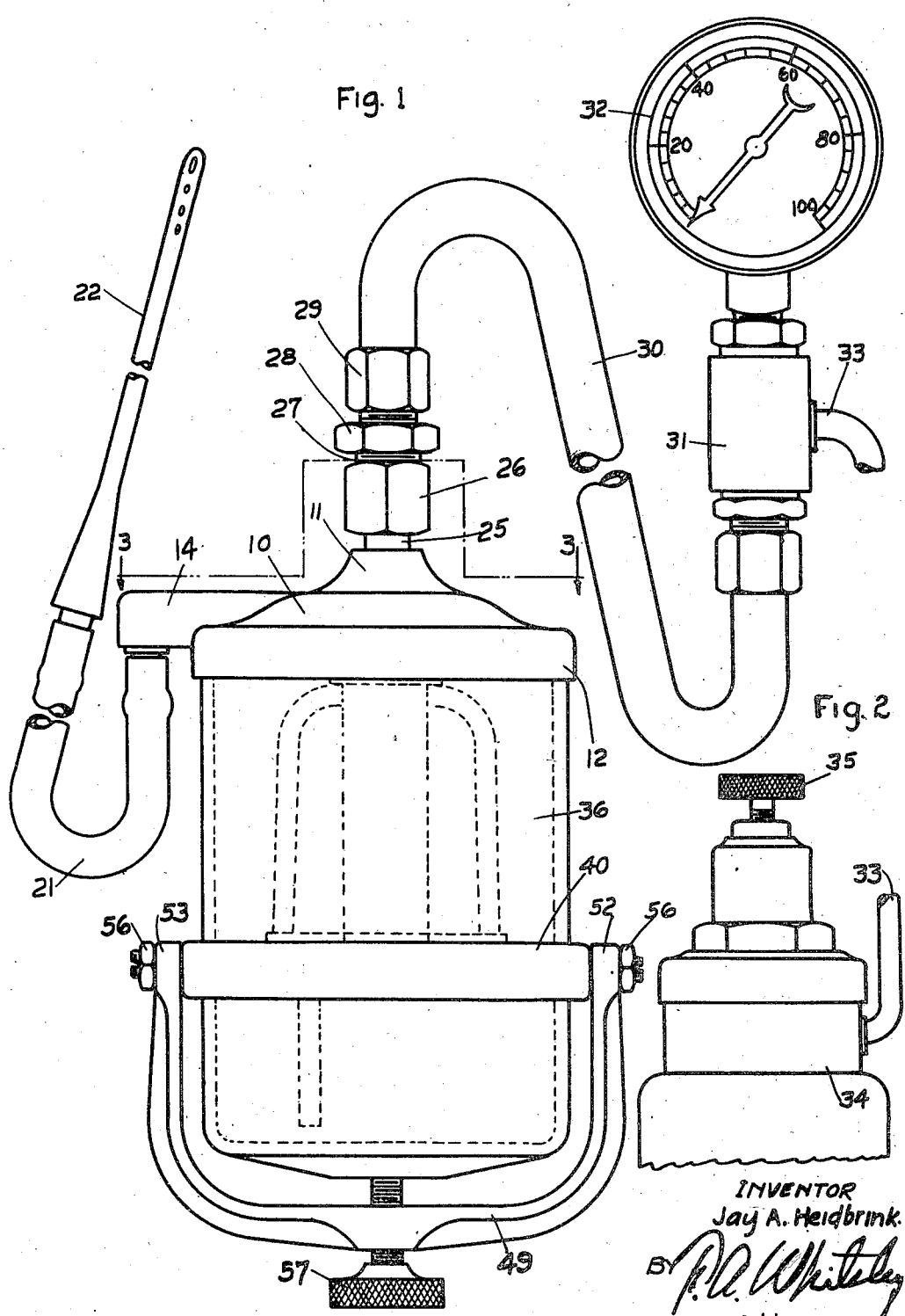

2,428,277

UNITED STATES PATENT OFFICE 2,428,277

HUMIDIFIER FOR OXYGEN GAS

Jay A. Heidbrink, Minneapolis, Minn., assignor to Air Reduction Company, Incorporated, New York, N. Y., a corporation of New York Application August 25, 1944, Serial No. 551,177

5 Claims. (Cl. 261—76)

My invention relates to oxygen delivering means for nasal catheters and has for its object, in connection with means for delivering oxygen through a nasal catheter, to provide an efficient means of substantially saturating the oxygen as delivered with water.

In the use of nasal catheters, because the oxygen gas is delivered under pressure so that jets thereof impinge upon the tissues of the pharynx, these jets tend to dry out the tissues producing grave discomfort to the patient. Such catheters are employed as a means of administering oxygen to bedridden patients where it is not practical to obtain other means of administering oxygen or where for other reasons the administration by a catheter is deemed desirable.

Heretofore attempts have been made to overcome this unpleasant drying effect by humidifying the oxygen gas before delivery to the patient. This has been done by conducting the oxygen gas to the lower part of a body of water in a container and allowing it to bubble up through the water before being carried on to the catheter. Some advantage has followed this method, but it has been found that only partial saturation of the oxygen stream at the temperature of its delivery has been effected by this method.

I have discovered that if a small jet of oxygen delivered at high pressure impinges upon streams of water spray crossing its path, and the resulting column of oxygen gas is freed from free water, substantially 100% water saturation of the oxygen delivered to the patient is possible, so that even though the oxygen jets strike the tissues at considerable speed there will be little drying because the oxygen already has taken up its maximum amount of water vapor. When oxygen so loaded with water vapor is delivered from the catheter it has been found that the injurious drying effect has been lessened or eliminated and the use of the nasal catheter for delivering oxygen has been made comparatively comfortable.

It is a principal object of my invention, therefore, to subject oxygen gas in its passage from a delivery tank to a nasal catheter to control by a small port so that, with high pressure behind it, the gas is delivered in a jet having great speed, and to bring to a point adjacent and contacting said jet the water to be vaporized.

It is a further object of my invention to employ the jet of oxygen in association with a Venturi tube for creating a degree of vacuum in a chamber opening laterally into the Venturi tube to the jet and to provide means for delivering water to form a layer in the bottom of said chamber and to deliver gas through said water to carry bubbles of gas and water to the tubes adjacent the oxygen jet.

It is a further object of my invention to provide a vaporizing tube surrounded by a vacuum chamber and to provide below the same a container for water with an air space between the surface of the water and the floor of the chamber and to form openings into the chamber one of which will carry a tube extending below the surface of the water whereby the vacuum in the chamber will cause water to enter and cover the floor of the chamber and will cause gas to go through the openings through the layer of water at the bottom of the chamber to carry the water in bubbles to the vaporizing tube.

It is a further object of my invention to provide a partition between the water container and the vacuum chamber which is sealed air-tight except for openings to the gas above the water in the container and to a tube extending below the surface of the water.

It is a further object of my invention to have the water container positioned so as to be removably attached in gas-tight relation below the walls of the vacuum chamber and the saturated oxygen delivery chamber, so that in adding a supply of water to the container it must be removed and can not be overfilled.

The full objects and advantages of my invention will appear in connection with the detailed description thereof given in the following specification, and the novel features of my invention by which the above indicated advantageous results are secured will be particularly pointed out in the claims.

In the drawings indicating an application of my invention in one of its forms:

Fig. 1 is a side elevation view of an apparatus embodying the principle of my invention, showing the connection from the catheter to the source of oxygen supply and to a gauge for indicating the delivery pressure of the oxygen.

Fig. 2 indicates diagrammatically a part of the oxygen tank.

Fig. 3 is a sectional elevation view of the apparatus taken on line 3—3 of Fig. 1.

Fig. 4 is a transverse sectional plan view of the apparatus taken on line 4—4 of Fig. 3.

Fig. 5 is a sectional plan view of the apparatus taken on line 5—5 of Fig. 3.

In the embodiment of my invention shown, a cap piece 10 is provided with an upstanding boss 11 and an outer annular flange 12. It has an annular horizontal seat 13 inside of the flange 12.

The cap piece 10 is also provided with an extension 14 extending laterally to one side of the cap piece and having a channel 15 therein which opens laterally at 16 into a space 17 within the cap piece 10, which space surrounds a tubular downturned nipple or boss 18. The passage 15 extends into a right-angled connected passage 19 in which is mounted a connector nipple 20 adapted to have applied thereto the tube 21 extending to the nasal catheter 22, of known construction.

The boss 11 is provided with a threaded opening 23 into which is threaded a connector piece 24 having an annular rib 25 which is engaged by a threaded cup 26. To the cup 26 is secured a second threaded connector piece 27, Fig. 1, and nuts 28 and 29 by which connection is made through tube 30 with a gas inlet connector 31. Connector 31 has gas connection with a gauge 32 showing the delivery pressure of the jet of oxygen and is also connected by means of a tube or other connecting means indicated diagrammatically at 33 with a source of oxygen supply 34. A customary valve 35 controls the flow of oxygen from oxygen tank 34 so that the delivery thereof may be at any selected pressure, as shown by the gauge 32.

Secured within the flange 12 is a cylinder 36. This cylinder is set gas-tight through packing 37 against seat 13 and encloses a chamber 38 which opens at its top into the chamber 17 and thus is in communication with the gas delivery passageway 15.

The cylinder 36 may be made of any suitable material. Some doctors and nurses have, however, been accustomed to see the bubbling of air and water and might wish to see this bubbling, for which reason the cylinder 36 will preferably be made of plastic or glass so as to be to a degree transparent.

To the lower annular edge of cylinder 36 is secured a partition member 39. This partition will be formed with an annular rim 40 which has an upstanding portion 41 engaging the lower annular wall of cylinder 36 and a packing 42 which is held between the lower edge of cylinder 36 and the partition 39 adjacent the wall of upstanding portion 41 of rim 40.

A second annular flange 43 extends downwardly from partition 39 so as to leave an annular groove 44 between it and the inner wall 45 of rim 40. Seated in the annular groove 44 is a packing gasket 46 against which the annular upper edge 47 of a cup member 48 is forced by means of a yoke 49. This yoke is provided at its upper end with trunnion screws 50 and 51 which are threaded through the ends 52 and 53 of the yoke 49 and extend into sockets 54 and 55 in the rim 40. Lock nuts 56 secure the trunnion screws 50 and 51 in fixed position. A thumb screw 57 threaded through a boss 58 in the yoke 49 engages with its end 59 a depression 60 in the center of the bottom 61 of cup 48. By screwing in or out on the thumb screw 57 the cup 48 may be forced into sealing engagement with gasket 46 and likewise may be released to be readily removed from the assembly for filling.

An upstanding annular flange 62 is formed with and concentrically positioned about the center of partition 39. Fitting within this flange 62 is an annular rim 63 at the bottom of a bell-shaped member 64 which encloses a chamber 65. The partition 39 separates chambers 38 and 65 about it from a chamber 66 below it formed in the cupped-shaped member 48.

The partition 39 has a multiplicity of holes 67 which lead from chamber 39 to chamber 66. Specifically, in the example shown, there are eight of these holes which give a free and easy flow of gas from the chamber 66 to the chamber 38, and thence to the passageway 15 and the nasal catheter. The combined area of the holes 67 is so great no currents of gas through them can exist sufficient to carry particles of free water from chamber 66 into chamber 38.

The partition 39 also has eight openings 68 leading from the chamber 65 within the bell-shaped member 64 to the chamber 66. These openings 68 hold a multiplicity of hollow connector members 69, to seven of which is attached a baffle plate 70, Figs. 3 and 5. In one of these latter openings, designated as 68', is mounted a tube 71 which passes through the plate 70 to a point 72 near the top of the bottom member 61. A space 73, Fig. 3, is thus left between the bottom surface of partition 39 and the top surface of plate 70.

An opening 74 is formed concentric with the axis of partition 39 and in this opening is mounted a Venturi tube 75 which is provided at its bottom with a horizontal flange 76 engaging under partition 39. The cylindrical inner wall of the tube 75 is shaped, as clearly shown in Fig. 3, with a narrow tubular portion 77 which constitutes the venturi in the interior 78 of tube 75 and which opens at the bottom into space 73.

The upper end of the Venturi tube 75 is externally threaded, as indicated at 79, and is adapted to be engaged by the internal thread 80 of boss 17 on cap piece 10. An annular gasket 81 comes between the lower edge 82 of the boss 17 and the crown of the bell-shaped member 64. Another annular gasket 83 comes between the lower annular edge of the bell-shaped member 64 and the top surface of partition member 39. It will be obvious, therefore, that by screwing the cap piece 10 upon the externally threaded upper end 79 of Venturi tube member 75 all the parts will be drawn together compressing gaskets 81 and 37 at the top and gaskets 76 and 42 at the bottom, thus sealing chamber 38 from the outside on one side and from chamber 65 on the other side. This is made possible by reason of the flange 76 on the bottom of Venturi tube 75 which, pulling up on partition 39, makes the sealing closures with all of the several gaskets above enumerated.

The opening 23 is extended below the tubular member 24 and has threaded in the lower part thereof a port member 84. Through this extends a channel 85 which has at its end a limit port 86 of very small diameter, say not to exceed twenty thousandths of an inch. This limit port is exactly centered over the Venturi openings 77 and the continued opening 78 through the Venturi tube 75, so that when oxygen gas is delivered thereto at considerable pressure, as indicated by the gauge 32, a sharp concentrated blast or jet of the gas moves down through the chamber 87 in the upper part of the Venturi tube through the Venturi opening 77 and thence through the opening 78 finally to impinge upon the guard plate 70 below the last-named opening. This movement tends to produce a vacuum in chamber 87.

A multiplicity of openings 88, Figs. 3 and 4, lead from chamber 65 into the upper Venturi chamber 87 so that gas is drawn from chamber 65 to fill this vacuum. This in turn causes gas to be drawn through openings 68 from above the water level 89 and below guard plate 70. At the same time this will cause water to be drawn through tube 71 and opening 68'. This water will spread out upon the top of partition 39 overflowing the openings 68, and the gas rushing through these openings will pick up bubbles or films of the water and carry it to the top of bell chamber 65 from which the gas and the water films will go through openings 88 into the upper Venturi chamber 87.

Here this water will be thrown against the swiftly-moving gas jet coming from limit port 86 and will be finely divided, falling down through Venturi opening 77. The water-laden gas will be thrown upon the guard plate 70 where all free water will be precipitated therefrom. The further flow of the gas, which by then will become substantially 100% saturated with water vapor, will pass through the openings 67 into chamber 38, thence through opening 16, through passageway 15, connector 20, and tube 21 to the catheter 22 where it will be delivered to the patient.

The guard plate 70 will preferably be made of porous metal or very finely perforated metal which presents a roughened surface to the stream of gas and water particles impinged upon it, and tends at the same time to precipitate the free water therein and to increase absorption of water vapor into the gas stream. Furthermore, the gas being thus discharged upon the guard plate 70 will be in volume much greater than the amount of oxygen being introduced into the system so that the same gas will return through ports 68 and chamber 65 so as to recirculate many times, thus greatly increasing the absorption of water vapor thereinto.

The bell-shaped member 64, like the cylinder 36, may be made of glass or transparent plastic so that the violent ebullition and bubbling of the water in chamber 65 will be visible to the operator, keeping him advised that saturation of the oxygen is going on.

The advantages of my invention have been made quite apparent by the foregoing description.

The primary advantage is, of course, that by the use of this humidifying instrument the oxygen gas delivered in multiple jets from the catheter 22 is loaded with substantially 100% or more of moisture and hence does not effect any considerable degree of drying of the tissues against which it is caused to impinge.

A further advantage of my invention is that it provides the vacuum, and effects the atomizing of the water and the driving of the gas through the venturi by the delivery of oxygen itself. The oxygen must as a matter of course be delivered to the patient, and the use of my apparatus makes that delivery do the work of atomizing and removing free water from the water-saturated air going to the catheter.

A further great advantage of my invention resides in the fact that the manner of repeatedly driving the gas and atomized water carried by it through the venturi 77 and upon guard plate 70 effectively precipitates all the free water particles so the gas with its high content of moisture does not convey with it any free water.

A further very marked advantage of this invention resides in the fact that the cup member 48 which holds the water supply is mounted for easy removal from the apparatus. Since there is no means of supplying water excepting to this cup member when removed it is obvious that when it is refilled it will not be overfilled so as to prevent proper action of the humidifier. Even if the chamber 66 were completely filled so apparently to overflow the guard plate 70, immediately upon suction action beginning the water will be drawn up into the bottom of chamber 65 so as to drop the level to the point indicated at 89 with a free air space below guard plate 70.

I claim:

1. An apparatus for supplying water vapor to oxygen gas delivered to a nasal catheter, comprising a casing forming an enclosed space therein, a partition across the space dividing it into upper and lower portions, with a body of water in the lower portion of such volume that its surface will be spaced from the lower surface of the partition, the space above the partition containing a centrally positioned vertical jet tube opening directly through the partition to the water containing portion, means forming with the partition a second chamber surrounding the jet tube apertures through the partition from the second chamber opening into the water chamber above the surface of the water therein, a second tube opening from the second chamber and extending below the surface of the water in the water chamber, said upper space portion forming an outer gas delivery chamber about the second chamber opening into the water chamber above the surface of the water therein and leading to the nasal catheter, a supply of oxygen under pressure and a nozzle connected therewith for causing the delivery of a jet of oxygen at high velocity into the jet tube tending to cause a vacuum therein, an opening from the jet tube into the second chamber, whereby the vacuum formed in the jet tube will be caused to extend thereinto and water and gas will be drawn from the second tube and the apertures into said second chamber through the openings in the partition for causing formation of bubbles and spray therein and will be caused to move across the oxygen jet thereby being atomized so the oxygen gas going from the outer delivery chamber will be caused to contain substantially 100% water vapor.

2. An apparatus for supplying water vapor to oxygen gas delivered to a nasal catheter, comprising a cap piece, a tubular member and a partition member, a centrally positioned tube extending through the partition member and drawing the members together in gas-tight relation by being threaded into the cap member, a water holding cup having cylindrical walls and means for clamping it to the under side of the partition so it may be readily removed for filling with water, a supply of oxygen under pressure and a nozzle connected therewith for causing a jet of oxygen to be injected into the upper part of the tube at high velocity to tend to cause a vacuum in the tube, means forming a chamber on the partition surrounding the tube having an opening extending through the tube to a point adjacent the jet and other openings extending therefrom through the partition, a second tube entering the last named chamber and extending below the surface of the water in the water-containing chamber, whereby the action of the jet tending to form a vacuum in the tube and in the last-named chamber will cause water to be drawn into said last-named chamber through the second tube and gas to be drawn through the openings in the partition to bubble through the water about the jet-forming tube and to withdraw the gas and water from the last-named chamber through the opening into the jet-forming tube thereby causing the oxygen gas to circulate and be humidified.

3. An apparatus for supplying water, vapor to oxygen gas delivered to a nasal catheter, comprising a casing formed to include a water chamber adapted to hold water with the level thereof leaving a gas space above it, a vertical jet tube open at its bottom to said gas space, a guard plate in said gas space extending under and laterally about the opening from the jet tube, a supply of oxygen under pressure and a nozzle connected therewith for causing a jet of oxygen to be injected into the upper part of the tube at high velocity to tend to cause a vacuum in the tube, means forming a chamber on the partition surrounding the tube having an opening extending through the tube to a point adjacent the jet and other openings extending therefrom through the partition, a second tube entering the last named chamber and extending below the surface of the water in the water-containing chamber, whereby the action of the jet tending to form a vacuum in the tube and in the last-named chamber will cause water to be drawn into said last-named chamber through the second tube and gas to be drawn through the openings in the partition to bubble through the water about the jet forming tube and to withdraw the gas and water from the last-named chamber through the opening into the jet-forming tube thereby causing the oxygen gas to circulate and be humidified.

4. An apparatus for supplying water vapor to oxygen gas delivered to a nasal catheter, comprising means forming a chamber containing water, a vertically extending tube opening into said chamber above the surface of the water, a supply of oxygen under pressure and a nozzle connected therewith for causing a jet of oxygen to be injected into the upper part of the tube at a high velocity to tend to cause a vacuum in the tube, a gas inlet port through the tube positioned near the nozzle about said jet, means forming a second chamber about the tube including a partition separating it from the first named chamber, openings through the partition into the water-containing chamber above the surface of the water therein, and a second tube extending below the water surface in the water-containing chamber and into the last named chamber, whereby the action of the jet tending to form a vacuum in the tube and in the second named chamber will cause water to be drawn into the second chamber through the second tube and gas to be drawn through the openings in the partition to bubble through the water about the first named tube, and will draw the gas and water through the opening into the first named tube.

5. An apparatus for supplying water vapor to oxygen gas delivered to a nasal catheter, comprising means forming a chamber containing water, a vertically extending tube opening into said chamber above the surface of the water, said tube being internally shaped to form a venturi, a supply of oxygen under pressure and a nozzle connected therewith for causing a jet of oxygen to be injected into the upper part of the tube at a high velocity to tend to cause a vacuum in the tube, a gas inlet port through the tube positioned near the nozzle about said jet, means forming a second chamber about the tube including a partition separating it from the first named chamber, openings through the partition into the water-containing chamber above the surface of the water therein, and a second tube extending below the water surface in the water-containing chamber and into the last named chamber, whereby the action of the jet tending to form a vacuum in the tube and in the second named chamber will cause water to be drawn into the second chamber through the second tube and gas to be drawn through the openings in the partition to bubble through the water about the first named tube, and will draw the gas and water through the opening into the first named tube.

JAY A. HEIDBRINK.

REFERENCES CITED

The following references are of record in the file of this patent:

UNITED STATES PATENTS

| Number | Name | Date |
|---|---|---|
| 2,238,280 | Nutting | Apr. 15, 1941 |
| 2,245,696 | McKee | June 17, 1941 |
| 576,108 | Gibson | Feb. 2, 1897 |
| 2,003,363 | Hodges et al. | June 4, 1935 |
| 2,212,288 | Decker | Aug. 20, 1940 |
| 1,766,124 | Hendrickson | June 24, 1930 |
| 2,251,790 | Hallerberg | Aug. 5, 1941 |
| 1,195,315 | Williams | Aug. 22, 1916 |
| 1,438,926 | Leet | Dec. 12, 1922 |
| 1,746,089 | McLaughlin | Feb. 4, 1930 |
| 2,109,743 | Faverty et al. | Mar. 1, 1938 |

FOREIGN PATENTS

| Number | Country | Date |
|---|---|---|
| 398,640 | Germany | Sept. 19, 1922 |